US012602028B2

(12) United States Patent
Hamlin et al.

(10) Patent No.: US 12,602,028 B2
(45) Date of Patent: Apr. 14, 2026

(54) SYSTEMS AND METHODS FOR ENABLING TRUSTED ON-DEMAND DISTRIBUTED MANUFACTURING

(71) Applicant: Siemens Industry Software Inc., Plano, TX (US)

(72) Inventors: Teri Hamlin, Granbury, TX (US); Gregory Bowman, Lorton, VA (US); Barbara Humpton, Arlington, VA (US); Joseph Bonnin, Charlotte, NC (US); Alastair Orchard, Genua (IT)

(73) Assignee: Siemens Industry Software, Inc., Plano, TX (US)

( * ) Notice: Subject to any disclaimer, the term of this patent is extended or adjusted under 35 U.S.C. 154(b) by 292 days.

(21) Appl. No.: 18/554,297

(22) PCT Filed: Mar. 29, 2022

(86) PCT No.: PCT/US2022/022256
§ 371 (c)(1),
(2) Date: Oct. 6, 2023

(87) PCT Pub. No.: WO2022/221047
PCT Pub. Date: Oct. 20, 2022

(65) Prior Publication Data
US 2024/0231324 A1 Jul. 11, 2024

Related U.S. Application Data

(60) Provisional application No. 63/173,690, filed on Apr. 12, 2021.

(51) Int. Cl.
*G05B 19/4155* (2006.01)

(52) U.S. Cl.
CPC .................... *G05B 19/4155* (2013.01); *G05B 2219/31372* (2013.01)

(58) Field of Classification Search
CPC .................. G05B 19/4155; G05B 2219/31372
See application file for complete search history.

(56) References Cited

U.S. PATENT DOCUMENTS 10,374,812 B2 * 8/2019 Schepers ............... H04L 9/3278
2018/0094953 A1 4/2018 Colson et al.
(Continued)

OTHER PUBLICATIONS

Arcenegui, Javier et al: "Secure Management of IoT Devices Based on Blockchain Non-fungible Tokens and Physical Unclonable Functions"; arxiv.org, Cornell University Library, 201 Olin Library Cornell University Ithaca, NY 14853; Oct. 14, 2020 (Oct. 14, 2020), pp. 24-40, XP047566622.

*Primary Examiner* — Hussein Elchanti

(57) ABSTRACT

A system (100) for enabling trusted on-demand distributed manufacturing includes a first interface (120) configured to receive product data from a product data source (110-A, 110-B, 110-N), a second interface (130) configured to exchange manufacturing data from a manufacturing data source (140-A, 140-B, 140-N), a trust anchor module (170) configured via computer executable instructions to add a physically unclonable function (PUF) to a product, generate a non-fungible token (NFT) to represent the product on an NFT platform (172), a matching module (174) configured via computer executable instructions to match the product characteristics with requirements of a buyer and manufacturing capabilities of a producer, and a traceability module (176) to verify success of a manufacturing process.

20 Claims, 4 Drawing Sheets

(56) References Cited

U.S. PATENT DOCUMENTS

| | | | |
|---|---|---|---|
| 2019/0007222 A1* | 1/2019 | Noguchi | H04L 9/3278 |
| 2020/0294011 A1* | 9/2020 | Robertson | H04L 9/3066 |
| 2020/0298468 A1* | 9/2020 | Drummond | B29C 31/04 |
| 2021/0256536 A1* | 8/2021 | Abdelsamie | G06Q 30/018 |
| 2022/0116231 A1* | 4/2022 | Choi | G06Q 20/227 |
| 2024/0231324 A1* | 7/2024 | Hamlin | G05B 19/4155 |

* cited by examiner

FIG. 1

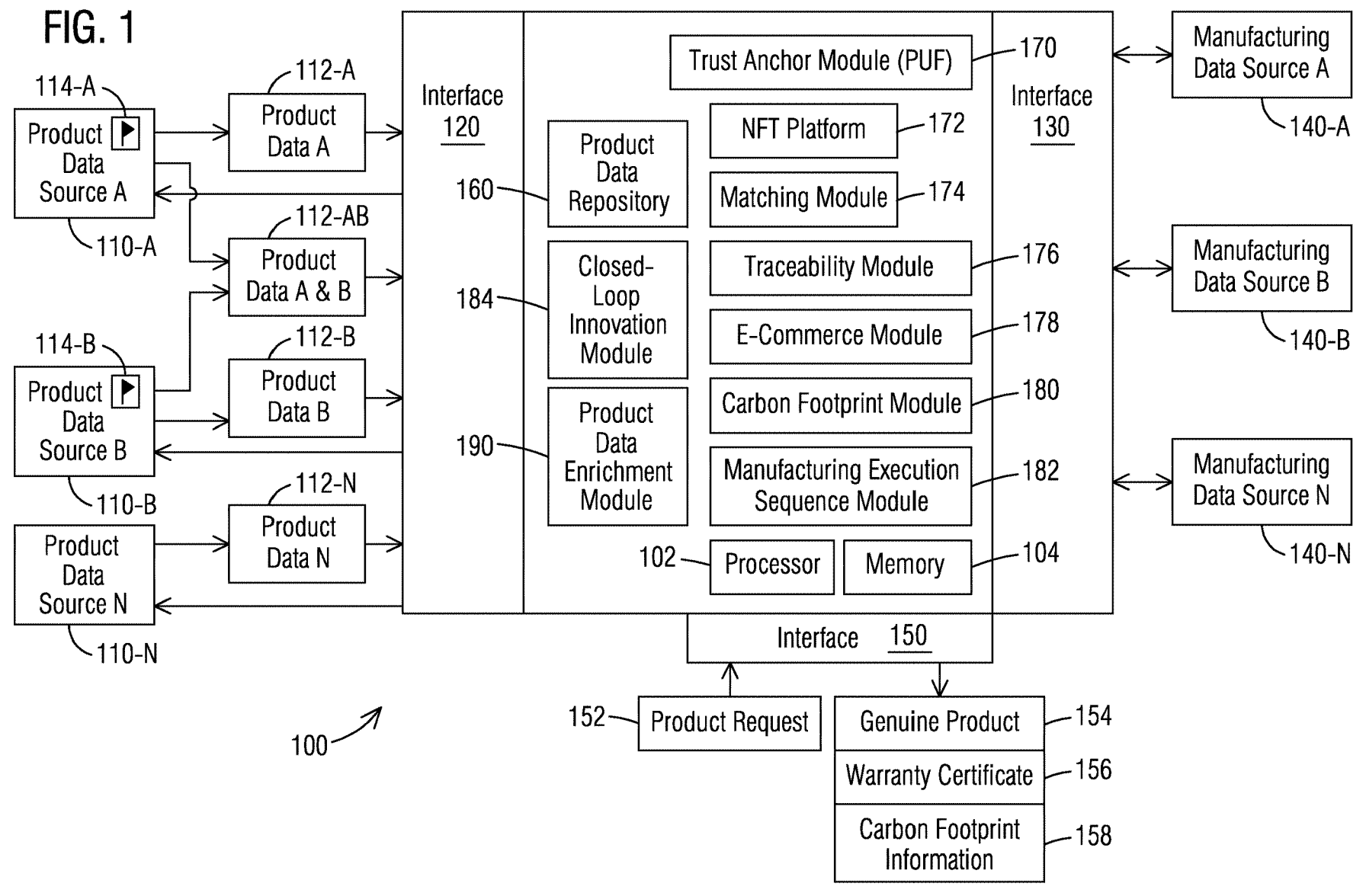

Manufacturing Data Source A — 140-A

Manufacturing Data Source B — 140-B

Manufacturing Data Source N — 140-N

Interface 130

Trust Anchor Module (PUF) — 170

NFT Platform — 172

Matching Module — 174

Traceability Module — 176

E-Commerce Module — 178

Carbon Footprint Module — 180

Manufacturing Execution Sequence Module — 182

Memory — 104

Processor — 102

Interface 150

Product Request — 152

Genuine Product — 154

Warranty Certificate — 156

Carbon Footprint Information — 158

Product Data Repository — 160

Closed-Loop Innovation Module — 184

Product Data Enrichment Module — 190

Interface 120

Product Data A — 112-A

Product Data A & B — 112-AB

Product Data B — 112-B

Product Data N — 112-N

Product Data Source A — 110-A — 114-A

Product Data Source B — 110-B — 114-B

Product Data Source N — 110-N

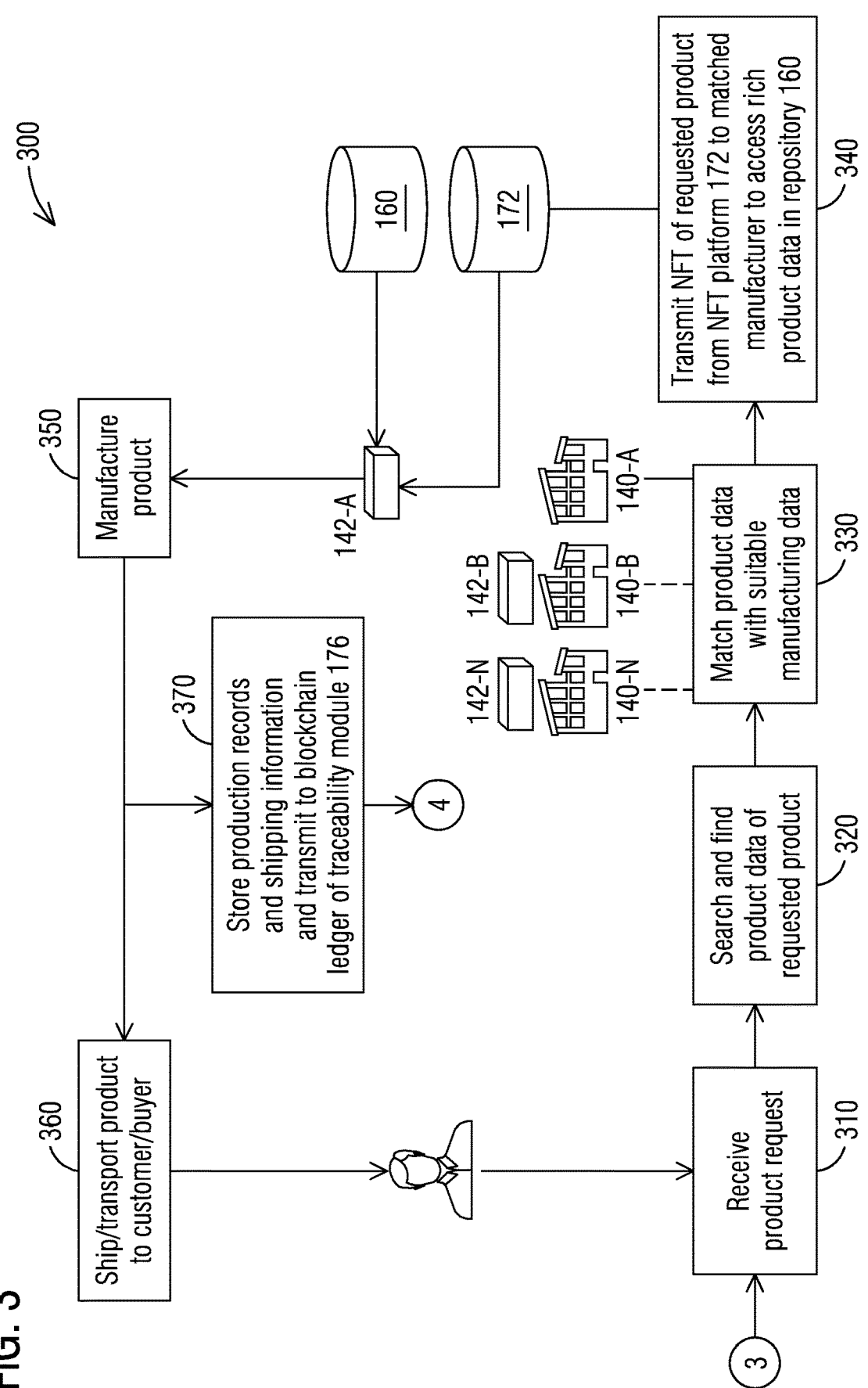

300

350 — Manufacture product

160

172

142-A

340 — Transmit NFT of requested product from NFT platform 172 to matched manufacturer to access rich product data in repository 160

140-A

142-B    140-B

142-N    140-N

330 — Match product data with suitable manufacturing data

320 — Search and find product data of requested product

370 — Store production records and shipping information and transmit to blockchain ledger of traceability module 176

4

360 — Ship/transport product to customer/buyer

310 — Receive product request

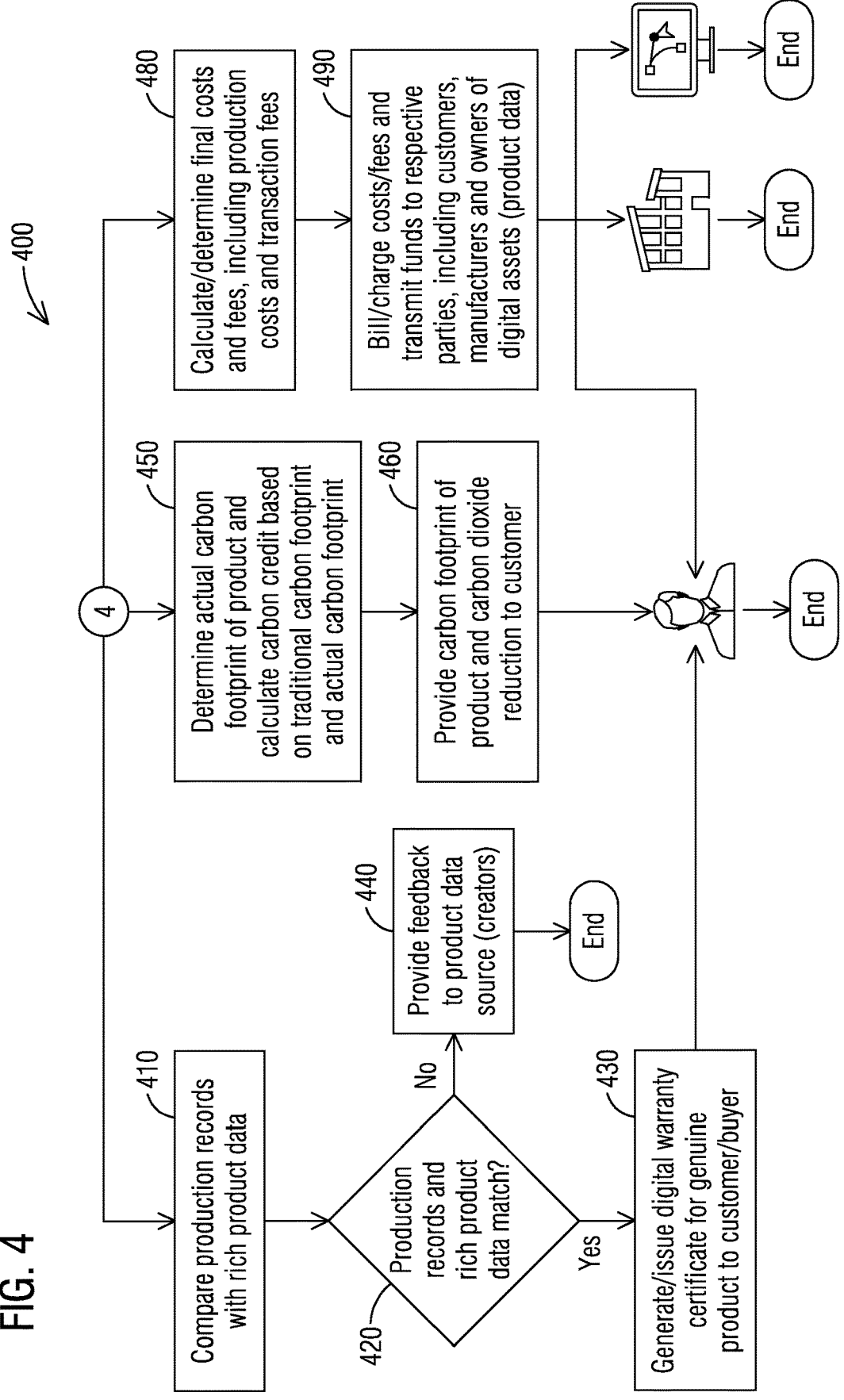

400

410 — Compare production records with rich product data

420 — Production records and rich product data match?

No → 440 — Provide feedback to product data source (creators) → End

Yes → 430 — Generate/issue digital warranty certificate for genuine product to customer/buyer

4

450 — Determine actual carbon footprint of product and calculate carbon credit based on traditional carbon footprint and actual carbon footprint 460 — Provide carbon footprint of product and carbon dioxide reduction to customer → End 480 — Calculate/determine final costs and fees, including production costs and transaction fees 490 — Bill/charge costs/fees and transmit funds to respective parties, including customers, manufacturers and owners of digital assets (product data) → End End

SYSTEMS AND METHODS FOR ENABLING TRUSTED ON-DEMAND DISTRIBUTED MANUFACTURING

BACKGROUND

1. Field

Aspects of the present disclosure generally relate to systems and methods for enabling trusted on-demand distributed manufacturing to a given standard.

2. Description of the Related Art

Manufacturers, governments, and consumers are concerned about unpredictable threats disrupting society, supply chains and economies in a connected world. Physical supply chains are vulnerable, easily broken, carbon heavy and expensive. Parts and products made quickly and affordably, to a standard, are generally not available at or near the point of need. This is largely because no easy way exists to engage in a secure and holistic business process combining the commerce of digital assets, the full power and flexibility of distributed manufacturing as a service, and a proof to a given standard.

Creators (designers who own the product and related brand Intellectual Property), producers (operators of manufacturing nodes) and buyers (individual or corporate customers looking to procure a product) may need a secure way to engage in the commerce of manufacturable digital assets and production capacity to create shock proof supply chains, lower costs and carbon emissions, create greater profit, and allow for sustainable localized production at or near the point of need—and do it at the same level of quality, authenticity and security of traditionally made goods.

SUMMARY

Briefly described, aspects of the present disclosure generally relate to systems and methods for enabling trusted on-demand distributed manufacturing.

The described systems and methods include a platform that connects creators, producers, and buyers in a powerful 3-sided marketplace. The marketplace holds manufacturable digital assets securely in digital escrow and requires a proof to standard, allowing rapid development, local manufacturing and lighter logistics while creating new revenue streams for all participants.

Instead of producing and warehousing parts and shipping them to the point of need, the described systems and methods allow for trusted, genuine production at or near the point of need through distributed manufacturing as a service. The proof to standard combines digital evidence with a physical fingerprint at the product level, which ties the digital evidence back to the physical product to assure authenticity, security, and quality to standard of distributed, flexible manufacturing.

A first aspect of the present disclosure provides a system for enabling trusted on-demand distributed manufacturing including at least one processor and at least one memory, the system comprising a first interface configured to receive product data from a product data source, a second interface configured to exchange manufacturing data from a manufacturing data source, a trust anchor module configured via computer executable instructions to add instructions for a physically unclonable function (PUF) to the product data, generate a non-fungible token (NFT) to represent a product on an NFT-platform, and a matching module configured via computer executable instructions to match the product data with the manufacturing data based on manufacturing characteristics for producing the product as described in the product data.

A second aspect of the present disclosure provides a method for enabling trusted on-demand distributed manufacturing, the method comprising through operation of at least one processor, receiving product data from a product data source, providing instructions to add a physically unclonable function to the product data, generating a non-fungible token (NFT) to represent a product on an NFT platform, exchanging manufacturing data from a manufacturing data source, and matching the product data with manufacturing data based on manufacturing characteristics for producing a product as described in the product data.

A third aspect of the present disclosure provides a non-transitory computer readable medium encoded with processor executable instructions that when executed by at least one processor, cause the at least one processor to carry out a method for enabling trusted on-demand distributed manufacturing as described herein.

BRIEF DESCRIPTION OF THE DRAWINGS

FIG. 1 illustrates a schematic diagram of a system for enabling design and trusted on-demand distributed manufacturing in accordance with an exemplary embodiment of the present disclosure.

FIG. 2, FIG. 3, and FIG. 4 illustrate schematic diagrams of methods for enabling design and trusted on-demand distributed manufacturing in accordance with an exemplary embodiment of the present disclosure.

DETAILED DESCRIPTION

Figure 2:
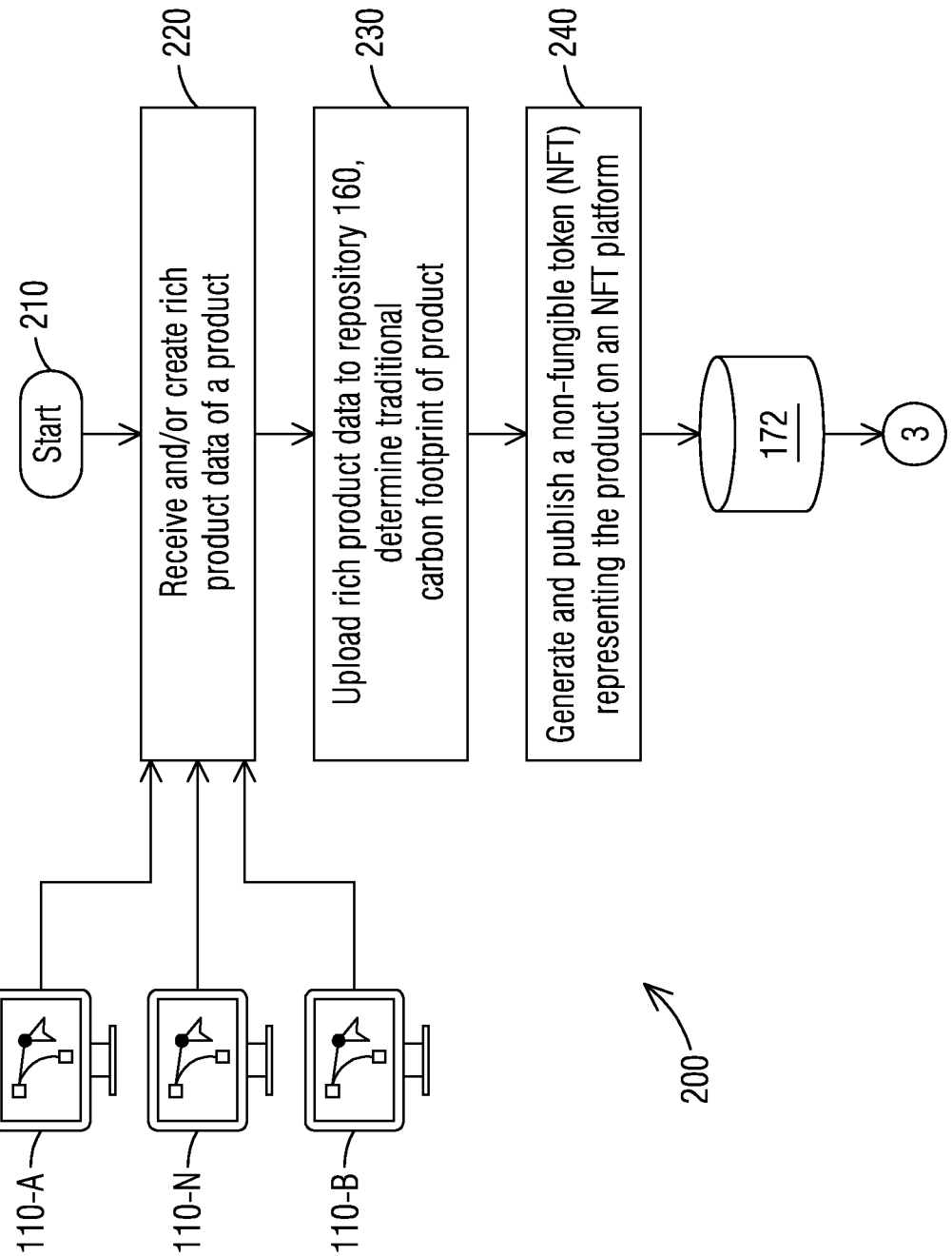

To facilitate an understanding of embodiments, principles, and features of the present disclosure, they are explained hereinafter with reference to implementation in illustrative embodiments. In particular, they are described in the context of being systems and methods for enabling trusted on-demand distributed manufacturing to a given standard. Embodiments of the present disclosure, however, are not limited to use in the described systems, devices or methods.

FIG. 1 illustrates a schematic diagram of a system 100 for enabling trusted on-demand distributed manufacturing in accordance with an exemplary embodiment of the present disclosure. The system 100 may herein also be referred to as exchange, platform, marketplace, or 3-sided marketplace.

An aspect of the system 100 includes securely storing and processing digital assets. Digital assets are generally described herein as product data, such as product data 112-A, 112-B, 112-N. Product data 112-A, 112-B, 112-N include many types of industrial or technical data and information, including but not limited to technical drawings, e.g. CAD drawings (discrete industries), formulations (process industries) material specifications, manufacturing instructions, product tolerances, quality targets etc.

According to an exemplary embodiment of the present disclosure, system 100 comprises a plurality of product data sources 110-A, 110-B, 110-N, wherein each data source 110-A, 110-B, 110-N comprises or provides the product data 112-A, 112-B, 112-AB, 112-N. The product data 112-A, 112-B, 112-AB, 112-N comprise a plurality of data and information relating to industrial product(s), such as for example a rear control arm or a gasket for an automobile, a seal or a bearing of an electromotor, and many different types of products or components in the fields of automotive, space, commercial equipment, pharmaceuticals, aerospace and defense, energy and power, oil and gas, medical devices, electronics, consumer packaged goods, food and beverage, footwear and apparel, etc. The data sources 110-A, 110-B, 110-N and data 112-A, 112-B, 112-AB, 112-N are digital data and data sources, and are provided, for example created, designed or generated, by creators, proprietors, or holders of the product data, i.e. digital assets.

As illustrated in FIG. 1, product data source 110-A comprises product data 112-A, data source 110-B comprises product data 112-B and product data source 110-N comprises product data 112-N. It should be noted that system 100 may comprise many more data sources than illustrated in FIG. 1, provided by many different creators, combination of creators, proprietors, or holders of product data.

In another embodiment, the system 100 may provide creators or holders of the product data sources 110-A, 110-B, 110-N with an additional, optional mechanism to commercialize their digital assets. For example, by setting a 'Allow Re-combination' flag 114-A, 114-B to true, a creator provides permission to other creators or users of the platform/system 100 to modify or amend the digital assets/product data. For example, other creators/users are allowed to extend a certain design of a component, or to re-combine a design with a design of another creator in order to derive a novel design that may be offered within the system 100. As FIG. 1 illustrates, both creators of product data sources 110-A and 110-B allow for re-combination by setting flag 114-A, 114-B, wherein new product data A&B have been created based on product data A and product data B, wherein the new product data A&B may include a new design for an automobile component. Such an extension or re-combination of digital assets/product data may only be performed online, i.e. while on or using the platform/system 100, thus not allowing downloading digital assets into a separate system for extension or re-combination in separate systems, such as third-party tools. Further, it should be noted that product data of original/source designs are not forfeit/lost to an extender/re-combinator. This means that when a buyer (costumer) requests a product to be manufactured of the novel (extended or re-combined) design, revenue is split with the creators from which it was partially derived.

The system 100 comprises a plurality of manufacturing data sources 140-A, 140-B, 140-N, that are digital data sources and are provided by producers and manufacturers of products or parts. It should be noted that system 100 may comprise many more manufacturing data sources than illustrated in FIG. 1, provided by many different producers or manufacturers. Producers or manufacturers provide production or manufacturing including processes or methods of product(s) that include subtractive manufacturing, additive manufacturing, robotic assembly, as well as traditional manufacturing/production methods that can be offered on the exchange as Manufacturing as a Service (MaaS) or Production as a Service (PaaS). The platform 100 provides opportunities and options for manufacturers and producers to 'sell', i.e. offer, production capabilities and manufacturing capacities for products that they can produce and sell.

The system 100 comprises a first interface 120, generally configured to provide, for example to collect, obtain or receive, the product data from the plurality of data sources 110-1, 110-2, 110-N. As indicated by the arrows in both directions between the first interface 120 and the product data sources 110-A, 110-B, 110-N, the system 100 and the product data sources 110-A, 110-B, 110-N interact with each other, for example exchange different data or information. On one hand, as noted, product data are submitted to the system 100, via the product data sources 110-A, 110-B, 110-N. On the other hand, feedback information or other data is provided by the system 100 back to the product data sources 110-A, 110-B, 110-N, which will be described later with reference to closed-loop innovation module 184.

Further, the system 100 comprises a second interface 130 generally configured to provide, for example to exchange manufacturing data from one or more manufacturing data sources 140-A, 140-B, 140-N. The manufacturing data sources 140-A, 140-B, 140-N, manufacturers, and their interaction with system 100 will be described in more detail with reference to FIGS. 2-4, in particular FIG. 3. As indicated by the double arrows, manufacturers and the manufacturing data sources 140-A, 140-B, 140-N interact in multiple ways with the system 100.

The system 100 comprises a third interface 150 configured to receive a product request 152. Such a request 152 is created and placed by a customer/buyer who would like to buy certain product(s), for example seal(s) and/or bearing(s) for an electromotor. In an example, the third interface 150, i.e. customer interface, can be a web-based interface, or mobile application offered through an app-store. Customers/buyers may include original equipment manufacturers (OEMs), manufacturers (MFRs), distributors, integrators, end users. Generally, the product request 152 includes type and quantity of the requested product, along with manufacturing characteristics and criteria such as a timeline, materials, price, and/or manufacturing location, etc. Eventually, as described later with reference to FIGS. 2-4, the customer/buyer will receive manufactured product(s), which is/are genuine product(s) 154, along with a (digital) warranty certificate 156 if the product(s) has/have been manufactured according to the specified manufacturing characteristics and criteria. Further, the customer/buyer may receive (digital) carbon footprint information 158, such as for example a carbon footprint calculation, and/or a carbon reduction calculation with respect to the manufactured and delivered product(s).

An interface as used herein, such as the interfaces 120, 130, 150 comprises or includes a type of mechanism for providing, including for example transferring, moving, exchanging, data from source(s) to one or more modules of the system 100. An example for an interface is a computing interface or software implemented interface which defines interactions between multiple software intermediaries. An example for a computing interface is an application programming interface (API), wherein the API interacts with separate software components or resources for providing, e.g. transferring or exchanging, data in an automated manner from the data sources to target application(s).

The system 100 may further comprise a repository 160 storing the product data 112-A, 112-B, 112-AB, 112-N. The repository 160 is configured to validate and/or classify the product data 112-A, 112-B, 112-AB, 112-N. Classification means that the product data 112-A, 112-B, 112-AB, 112-N is classified for example in different product categories, e.g. electric machines, automotive parts, medical devices etc.

Validation may include checking or verifying that necessary data and information for producing a product based on the product data are available and in a usable format. Such necessary data include basic shape data (e.g. technical/CAD drawings) of the product, and manufacturing characteristics including manufacturing instructions, quality targets and tolerances etc. for producing the product. All the information/data for a product including manufacturing characteristics are herein also referred to as rich product data.

Product data may be provided/uploaded to the system 100 in different ways, formats, or stages. For example, creators/owners may upload and/or publish complete rich product data of product(s). In another example, creators/owners may upload product data which are not enriched, i.e. information, such as manufacturing characteristics, may be missing. In such a case, digital asset validation fails, and product data enrichment module 190 of system 100 may be used to rectify a failed validation. For example, the product data enrichment module 190 may provide feedback to the creator/owner, e.g. product data source 110-A, 110-B, 110-N, that validation failed, and that further or different data/information is needed. In this case, product data enrichment module 190 can be utilized to enrich, e.g. complete, the product data with the necessary information. In yet another example, the system 100 can be used to create original designs of products, which means that original rich product data can be created 'online' on the system 100.

Further, the repository 160 may be configured to extract metadata describing the characteristics of the product/part and of the manufacturing process from the stored product data for further processing within the system 100. The product data repository 160 may be located centrally and can be part of the system 100. In this case, the repository 160 may be cloud-based and the rich product data are stored remotely on the cloud. In another embodiment, the rich product data may be stored decentralized, for example stored locally with the respective data source(s) 110-A, 110-B, 110-N. For example, an owner, creator or holder of product data may store product data 112-A, 112-B, 112-AB, 112-N outside of the central platform/system 100 locally within separate storage media.

In an embodiment of the present disclosure, the system 100 comprises multiple modules 170, 172, 174, 176, 178, 180, 182, 184, 190, at least one processor 102 and at least one memory 104. The at least one memory 104 may include any of a wide variety of memory devices including volatile and non-volatile memory devices, and the at least one processor 104 may include one or more processing units. The modules 170, 172, 174, 176, 178, 180, 182, 184, 190 each include an application or process, wherein the processor 102 and memory 104 are utilized by the modules 170, 172, 174, 176, 178, 180, 182, 184, 190 for performing, executing the applications. Of course, the at least one processor 102 may be configured to perform only the processes, applications described herein or can also be configured to perform other processes.

Utilizing the system 100 and one or more of the modules 170, 172, 174, 176, 178, 180, 182, 184, 190 the genuine (digital) product 154, along with a warranty certificate 156 providing proof to standard is manufactured and delivered to the customer/buyer. In an embodiment, the proof to standard is achieved using the following formula to validate the product/part as the genuine, digitally manufactured product 154:

| Genuine Digital Product= | Physically Unclonable Function (PUF) | + | Blockchain-based Evidence of Compliance to Standard |
|---|---|---|---|

Trust anchor module 170 is configured via computer executable instructions to create a non-fungible token (NFT) to represent the product on NFT Platform 172. The NFT includes the characteristics of the product, for example used both by matching module 174 to identify the product to buyers and traceability module 176 to validate manufacturing process(es), as well as a physically unclonable function (PUF) which will uniquely identify the product once produced.

The PUF is a unique physical mark or characteristic that can only be placed onto/into the product from the original product data. Cloning the part will not produce a perfect copy of the PUF and the part will therefore fail the proof to standard test. PUFs are available in two main categories: 1) existing and unique characteristic(s) of the product—such as imperfections of a metal part, chemical signature of a liquid, or radio noise emitted from a chipset; 2) a purposefully placed identifier such as an uncopiable or unreproducible QR code, shape matrix, or dithered mark.

In an embodiment, the trust anchor module 170 is configured to add a purposefully placed identifier such as an uncopiable or unreproducible code, e.g. QR code, shape matrix or dithered mark to the product data. Different types of identifiers may be used on different classes of products.

When a product request 152 is received, matching module 174 is configured via computer executable instructions to match or pair the product data of the requested product with manufacturing data, selected from the manufacturing data sources 140-A, 140-B, 140-N, based on manufacturing characteristics and criteria for producing the requested product. Specifically, the matching module 174 is configured to match the product data of the product with manufacturing data of at least one manufacturing data source selected from the plurality of manufacturing data sources 140-A, 140-B, 140-N. For example, an end user would like to buy bearings for an electromotor. Based on the rich product data (basic shape data and manufacturing instructions) for the bearing, the matching module 174 selects at least one manufacturing data source, e.g. manufacturer, for example source 140-A, that can produce the bearing as requested by the end user.

After selection of the manufacturer/producer, the rich product data, encrypted and/or uncopiable, are provided to the manufacturer/producer for producing the product, for example utilizing manufacturing execution sequence module 182 that provides the necessary manufacturing instructions to the manufacturer. The manufacturing execution sequence module 182 may be located centrally within the system 100, wherein the system 100 provides and transmits those instructions directly to the manufacturer. In another embodiment, the rich product data are transmitted to an industrial edge device of the manufacturer, wherein the industrial edge device will then facilitate manufacturing according to the manufacturing instructions, which will be described in more detail with reference to FIGS. 2-4, in particular FIG. 3. The product/part 154 is then produced for example via subtractive manufacturing, additive manufacturing, robotic assembly, etc., as well as traditional manufacturing/production methods that can be offered on the exchange 100 as Manufacturing as a Service (MaaS) or Production as a Service (PaaS).

In an exemplary embodiment, traceability module 176 is configured via computer executable instructions to receive and store production records in a blockchain ledger, compare the productions records with the encrypted product characteristics, stored in the NFT platform 172, and generate a warranty certificate 156 if the product has been produced according to the product data and manufacturing characteristics/criteria. The production records include but are not limited to ingredients (additive manufacturing), materials, machine settings, tolerances, quality results, qualification/certification of personnel, e.g. technician handling production etc., as provided by the manufacturer of the product. Details with respect to traceability will be described in more detail with reference to FIGS. 2-4, in particular FIG. 4.

The system 100 further comprises an e-commerce module 178 that is configured via computer executable instructions to facilitate buying and selling of products and associated services, including transmitting of funds. For example, the e-commerce module 178 is configured to facilitate buying and selling of the products, based on product requests 152, and transmitting funds between participating parties, such as customers (buyers of products), manufacturers/producers and product data creators. Further, the e-commerce module 178 can be configured to charge fee(s) per transaction(s) for the provider of the system 100, e.g. the 3-sided marketplace. For example, digital escrow fee(s) may be charged to the creators/providers of the product data, for securely holding and storing the product data in the system 100, for example in the repository 160 and/or NFT platform 172. Such digital escrow fee(s) can be recurrent (e.g. monthly, yearly fee) or a one-time fee or a fee per usage of the product data. Furthermore, additional fees may be charged to the customers/buyers and/or manufacturers per transaction(s) by the system/marketplace provider.

In another exemplary embodiment, the system 100 may comprise a carbon footprint module 180 configured via computer executable instructions to calculate carbon footprint(s) information 158 for manufactured and produced genuine products 154.

For example, the carbon footprint module 180, in connection with or utilizing other modules or components, for example the repository 160, is configured to calculate or estimate a traditional carbon footprint for a requested product based on traditional manufacturing and transportation means. Further, the carbon footprint module 180, utilizing for example the production records and transportation information, is configured to calculate an actual carbon footprint of the product 154 that is being produced and shipped to the customer/buyer, and to compare the traditional carbon footprint with the actual carbon footprint. Based on the comparison, the carbon footprint module 180 is configured to calculate and issue carbon dioxide ($CO_2$) reduction or savings. Utilizing the platform/system 100, the product 154 can be manufactured locally and at or near the point of need which reduces the carbon footprint drastically, compared to for example a product that has traditionally been produced in Asia and then shipped to Europe or North America.

In another embodiment of the present disclosure, the system 100 may comprise or may be configured as data management system that allows tracking of how many parts/products a particular customer/buyer has purchased, when the parts/products were purchased, and/or when they were installed. The system 100 may automatically track a part when it was installed in order to calculate when the part should be replaced or repaired. Further, the system 100 may digitally or virtually connect to a part that has been installed to monitor an actual use/condition of the part in order to ascertain when the part should be replaced or repaired. The data management system may be configured such that parts/products are automatically re-ordered for the customer/buyer, allowing the customer/buyer to have a lean inventory level.

In an embodiment, the system 100 is a cloud-based or remote computing system. This means for example that data processing and performing of routines and methods are performed remotely via a cloud computing. The system 100 with its components, such as modules 170, 174, 176, 178, 180, 182, 184, 190, NFT platform 172, repository 160, and interfaces 120, 130, 150, may be embodied as software or a combination of software and hardware. The modules, platform and interfaces may be separate components or may be existing components programmed to perform a method as described herein. For example, the repository 160 may be incorporated into an existing database or storage medium, or the trust anchor module 170 may be incorporated, for example programmed, into an existing encryption device, by means of software.

FIG. 2, FIG. 3 and FIG. 4 illustrate flowcharts of methods 200, 300, 400 for enabling trusted on-demand distributed manufacturing in accordance with exemplary embodiments of the present disclosure. The methods 200, 300, 400 may be performed or executed utilizing the system 100 with its components as described with reference to FIG. 1. The methods 200, 300, 400 illustrated in FIGS. 2-4 can be sub-routines, or independent routines, which can be carried out in parallel or subsequently, and may contribute to an overall method performed by system 100.

While the methods 200, 300, 400 are described as a series of acts or steps that are performed in a sequence, it is to be understood that the methods may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

With reference to FIG. 2, method or sub-routine 200 may start at 210 and comprises, through operation of processor 102, act 220 of receiving or collecting product data 112-A, 112-B, 112-AB, 112-N from the plurality of product data sources 110-A, 110-B, 110-N. As described earlier, product data sources 110-A, 110-B, 110-N comprise industrial or technical data and information, including but not limited to technical drawings, e.g. CAD drawings (discrete industries), formulations (process industries) material specifications, manufacturing instructions, product tolerances, quality targets etc. Product data 112-A, 112-B, 112-AB, 112-N may comprise original data, such as original designs, or may comprise novel designs of parts or components, that have been extended or re-combined based on original data, see for example product data 112-AB. In an example, creators, owners or holders of product data (digital assets) may use a subscription to system 100 to refactor and validate obsolete spare parts, wherein manufacturing instructions, quality targets, tolerances etc. are added to basic shape data of the product, thereby creating rich product data. The creator/owner/holder of the digital assets may create and store the rich product data themselves on a local computer system and simply upload and/or publish the rich product data to the system 100. In another example, the system 100 may create the rich product data, utilizing for example product data enrichment module 190, based on the data provided via the data source(s) 110-A, 110-B, 110-N and store the rich product data in repository 160.

As per act 230, the rich product data, are uploaded into repository 160. Repository 160 can be configured to validate and classify the rich product data. Further, carbon footprint estimations for a traditionally manufactured and transported product are determined, which may include utilizing carbon footprint module 180. The system 100, for example the repository 160 may be further configured to extract metadata describing the characteristics of the product/part, which can be stored in the repository 160 or can be loaded into a different sub-system for storing metadata.

Utilizing trust anchor module 170, digital instructions to add a physically unclonable function (PUF) to later manufactured products are added to each digital asset, specifically to the rich product data. Further, an NFT representing the product is generated and published on NFT platform 172. For example, a representation of the 'puffed' product data is encrypted and stored in NFT platform 172. The NFT platform 172 may be configured as NFT/E-commerce platform, which means that the e-commerce module 178 may be incorporated into platform 172. Product data that are uploaded and stored in system 100, for example in repository 160 in combination with platform 172, are available for ordering and manufacturing, which is described with reference to FIG. 3.

Method or sub-routine 300, as illustrated in FIG. 3, includes acts 310 and 320 of receiving a product request, and searching and finding product data of the requested product. Rather than using for example Amazon® to search the world's warehouses for parts that must be shipped vast distances, the customer/buyer searches in the system 100 for a part/product. Such a search could be a named part lookup, e.g. a rear control arm for a 1963 Ford Thunderbird, a Geolus® reverse shape search (provided by Siemens®), or a matching based on required characteristics.

Act 330 comprises, utilizing the matching module 174 and through operation of processor 102, matching or pairing the product request, specifically the product data corresponding to the product request, with suitable manufacturing data of manufacturing data sources 140-A, 140-B, 140-N. As noted, such manufacturing data include for example identification of a manufacturer, for example company X located in Orlando, Florida, US, along with manufacturing/production capabilities and characteristics, including for example but not limited to which products/components company X can produce, which materials are used, how is the product manufactured etc.

One or more manufacturers/producers 140-A, 140-B, 140-N may be available for producing the requested product—i.e. the production capabilities match the manufacturing characteristics of the part/product—but at different levels of efficiency based on their location and available technology. Each producer responds with a price, time, and $CO_2$ emissions commitment. The buyer evaluates producer(s) based on their preferred mix of cost, speed, and environmental impact. Ratings based on feedback from previous buyer-producer interactions as well as any 'preferred' status that a creator may have given to a producer may also contribute to the buyer's final decision.

With respect to the manufacturers/producers, product requests, e.g. orders, and corresponding manufacturing data are received via interface 130, which can be configured as industrial edge device 142-A, 142-B, 142-N. In an embodiment, each manufacturer/producer interacting with system 100 comprises at least one industrial edge device 142-A, 142-B, 142-N. Generally, an edge computing device provides an entry point into enterprise or service provider core networks. In our example, the industrial edge devices 142-A, 142-B, 142-N provide entry points and interfaces between manufacturers/providers and system 100. Each industrial edge device 142-A, 142-B, 142-N is registered within the system 100 to provide secure access to the encrypted rich product data and may host one or more of the modules of system 100. In a typical deployment, several of the modules of system 100 run on the edge device 142-A, 142-B, 142-N, including for example manufacturing execution sequence module 182 and aspects of the carbon footprint module 180 dedicated to the measurement of energy consumption during manufacturing. Further, since the industrial edge devices 142-A, 142-B, 142-N are registered and communicatively coupled to system 100, software updates or other updates can be deployed easily. Further, product data or manufacturing data can be exchanged easily between the edge devices 142-A, 142-B, 142-N and system 100.

When a suitable manufacturer for producing the requested product is found and selected (in our example of FIG. 3 manufacturing data source 140-A with industrial edge device 142-A is selected), the NFT of the respective product is transmitted from the NFT platform 172 to the respective industrial edge device 142-A (act 340). The industrial edge device 142-A is configured to use the NFT as a key to access the product data repository 160, to download and decode the encrypted rich product data and to execute the manufacturing sequence, wherein the industrial edge device 142-A can be coupled to industrial equipment to carry out each operation within the sequence.

In act 350, the requested product(s) is/are manufactured. In an embodiment, an embedded manufacturing execution sequence module 182 coordinates production of the part/product/assembly. Opcenter Bill of Process Execution Engine (BOPEX®), provided by Siemens®, is an example of a manufacturing execution sequence module 182 compatible with additive, subtractive, complex and formulated manufacturing, and can be incorporated into the industrial edge device 142-A, 142-B, 142-N. The industrial edge device 142-A that decodes and executes the manufacturing instructions also calculates the actual (true) carbon footprint, using an embedded carbon footprint module 180, for example the SiGreen® sustainability algorithm, provided by Siemens®. In act 360, the product 154 is shipped/transported to the customer. Further, the PUF, that is the unique physical mark or characteristic that can only be placed onto/into the product from the original product data, is added to the physical, i.e. manufactured, product or part. As described earlier, digital instructions for adding a PUF to the product/part are added to the digital assets.

Further, in act 370, the method 300 comprises storing production records and shipping information and transmitting this information to a blockchain ledger. Specifically, ingredients/materials, machine s qualification/certification of manufacturing personnel (e.g. technician), and Product Carbon Footprint (PCF) are sent by the industrial edge device 142-A to the blockchain ledger, incorporated in trusted traceability module 176. The production records and shipping information is utilized further, as described with reference to FIG. 4.

Sub-routine or method 400, as illustrated in FIG. 4, includes act 410 comprising comparing of the production records with the encrypted rich product data. Specifically, a smart contract on the blockchain ledger compares the trusted traceability record with the characteristics of the product as encoded in the corresponding NFT on the NFT platform 172. As per act 420, if the production records and product characteristics match, a digital warranty certificate 156 is generated and issued to the customer/buyer, for the genuine, digitally produced part 154 (act 430). If the production records and product characteristics do not match, for example technical tolerances of the product are not as required, a warranty certificate may not be issued. Instead, feedback information may be provided to the creators/owners of the product data, e.g. product data source 110-A, 110-B, 110-N, that products were not manufactured according to specified requirements, see act 440. Further, closed-loop innovation module 184 may be utilized for collecting and transmitting the feedback information to the creators/ owners of the product data and/or to the manufacturers/ producers of the product. For example, utilizing the closed-loop innovation module 184, manufacturing results are summarized and provided to the creators/owners and/or manufacturers to drive improvements on designs and/or manufacturing characteristics. Based on the feedback information, the creators/owners of the product data can modify or change the product data or aspects of the design of the product such that the product can be manufactured according to the required standards/characteristics.

As described before, utilizing the carbon footprint module 180, a traditional carbon footprint for a requested product based on traditional manufacturing and transportation means is determined or estimated. The traditional carbon footprint may be determined earlier within the process or at this point. In act 450, an actual carbon footprint of the manufactured product(s) is determined or calculated, utilizing the previously received and stored production records and transportation information, which is then compared with the traditional carbon footprint.

Based on the comparison, the actual carbon footprint and carbon dioxide ($CO_2$) savings of the product are immutably stored as a carbon emissions reduction certificate in the traceability module 172 and provided to the customer/buyer. Such a statement or message may include for example 9.45 kg, 72% $CO_2$ saved. The customer/buyer may read and review the warranty certificate 156 and carbon footprint information 158 digitally on a user interface device using a digital application ('app'), for example smartphone, tablet etc.

Sub-routine or method 400 further comprises act 480 of calculating/determining final costs and fees in connection with manufacturing of the product 154, including production costs and transaction fees, and act 490 of facilitating buying and selling of the product 154 and associated services, including transmitting of funds between participating parties, such as customers (buyers of products), manufacturers/producers and product data creators. Transaction fees may include digital escrow fee(s) charged to the creators/providers of the product data, for securely holding and storing the product data in the repository 160 and/or NFT platform 172. Such digital escrow fee(s) can be recurrent (e.g. monthly, yearly fee) or a one-time fee or a fee per usage of the product data. Furthermore, additional fees may be charged to the customers/buyers and/or manufacturers per transaction(s) by the system/marketplace provider.

The invention claimed is:

1. A system for enabling trusted on-demand distributed manufacturing including at least one processor and at least one memory, the system comprising:
   a first interface configured to receive product data from a product data source,
   a second interface configured to exchange manufacturing data from a manufacturing data source,
   a trust anchor module configured via computer executable instructions to
      add instructions for a physically unclonable function (PUF) to the product data,
      generate a non-fungible token (NFT) to represent a product on an NFT-platform, and
   a matching module configured via computer executable instructions to
      match the product data with the manufacturing data based on manufacturing characteristics for producing the product as described in the product data.

2. The system of claim 1,
comprising a plurality of product data sources and a plurality of manufacturing data sources, wherein the matching module is configured to match the product data with manufacturing data of at least one manufacturing data source selected from the plurality of manufacturing data sources.

3. The system of claim 1, further comprising:
a repository storing the product data, the product data comprising basic shape data describing a specific product and manufacturing characteristics including manufacturing instructions, quality targets and tolerances of the product.

4. The system of claim 3,
wherein the repository is configured to validate and classify the product data.

5. The system of claim 3,
wherein the repository is configured to extract metadata from the product data.

6. The system of claim 1, further comprising:
a third interface configured to receive a product request, wherein the product request includes a request for the product and manufacturing criteria including a timeline, materials, price, and/or manufacturing location.

7. The system of claim 1, further comprising:
a traceability module configured via computer executable instructions, in combination with the trust anchor module, to
   receive and store production records of the product in a blockchain ledger,
   compare the production records with the product characteristics stored in the NFT platform, and
   generate a warranty certificate if the product is manufactured according to the product characteristics and manufacturing results.

8. The system of claim 7,
wherein the production records comprise ingredients, materials, machine settings, quality results, tolerances of the product, and/or qualification information of manufacturing personnel.

9. The system of claim 1, further comprising:
an e-commerce module configured via computer executable instructions to
   calculate costs and fees in connection with manufacturing of the product, and
   facilitate buying and selling of the product and associated services, including transmitting of funds.

10. The system of claim 1, further comprising:
a carbon footprint module configured via computer executable instructions to
   determine a traditional carbon footprint and an actual carbon footprint of the product, and
   determine a carbon dioxide reduction based on the traditional and the actual carbon footprint.

11. The system of claim 1, further comprising:
an industrial edge device configured to download and decode the product data and to execute manufacturing instructions of the manufacturing characteristics, wherein the industrial edge device is coupled to an execution engine for producing the product.

12. The system of claim 1, further comprising:
a manufacturing execution sequence module configured to execute the manufacturing instructions utilizing an execution engine for producing the product.

13. A method for enabling trusted on-demand distributed manufacturing, the method comprising through operation of at least one processor:

receiving product data from a product data source, providing instructions to add a physically unclonable function (PUF) to the product data, generating a non-fungible token (NFT) to represent a product on an NFT platform, exchanging manufacturing data from a manufacturing data source, and matching the product data with manufacturing data based on manufacturing characteristics for producing a product as described in the product data.

14. The method of claim 13, further comprising:

storing the product data in a repository, the product data comprising basic shape data describing a specific product and manufacturing characteristics including manufacturing instructions, quality targets and tolerances of the product.

15. The method of claim 13, further comprising:

validating, classifying the product data, and extracting metadata from the product data.

16. The method of claim 13, further comprising:

receiving a product request for the product, wherein the product request includes manufacturing criteria including a timeline, materials, price, and/or manufacturing location.

17. The method of claim 13, further comprising:

manufacturing the product including adding the PUF to the product, receiving and storing production records of the product in a blockchain ledger, comparing the production records with the product characteristics stored in the NFT platform, and generating and issuing a warranty certificate if the product is manufactured according to the product characteristics and manufacturing results.

18. The method of claim 13, further comprising:

calculating costs and fees in connection with manufacturing of the product, and facilitating buying and selling of the product and associated services, including transmitting of funds.

19. The method of claim 13, further comprising:

determining carbon credit(s) for the product, and generating and issuing a corresponding carbon credit certificate.

20. A non-transitory computer readable medium encoded with processor executable instructions that when executed by at least one processor, cause the at least one processor to carry out a method for enabling trusted on-demand distributed manufacturing as claimed in claim 13.

* * * * *